(12) United States Patent
Sunderland et al.

(10) Patent No.: US 8,850,306 B2
(45) Date of Patent: Sep. 30, 2014

(54) TECHNIQUES TO CREATE STRUCTURED DOCUMENT TEMPLATES USING ENHANCED CONTENT CONTROLS

(75) Inventors: Mark Sunderland, Seattle, WA (US); Tristan Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/240,722

(22) Filed: Sep. 22, 2011

(65) Prior Publication Data

US 2012/0254730 A1 Oct. 4, 2012

Related U.S. Application Data

(60) Provisional application No. 61/468,473, filed on Mar. 28, 2011.

(51) Int. Cl.
 G06F 17/00 (2006.01)
 G06F 17/24 (2006.01)
(52) U.S. Cl.
 CPC .................................. *G06F 17/248* (2013.01)
 USPC ....................................................... 715/235
(58) Field of Classification Search
 USPC .................................. 715/234, 235, 236, 237
 See application file for complete search history.

(56) References Cited

U.S. PATENT DOCUMENTS

| | | | | |
|---|---|---|---|---|
| 5,388,203 A | * | 2/1995 | Kaneko | 715/837 |
| 5,845,304 A | * | 12/1998 | Iijima | 715/234 |
| 5,910,987 A | * | 6/1999 | Ginter et al. | 705/52 |
| 6,055,543 A | * | 4/2000 | Christensen et al. | 1/1 |
| 6,199,082 B1 | * | 3/2001 | Ferrel et al. | 715/205 |
| 6,912,538 B2 | | 6/2005 | Stapel et al. | |
| 6,917,969 B2 | | 7/2005 | Aggarwal et al. | |
| 7,051,276 B1 | * | 5/2006 | Mogilevsky et al. | 715/209 |
| 7,644,354 B2 | * | 1/2010 | Rogerson et al. | 715/234 |
| 7,703,007 B2 | | 4/2010 | Collie et al. | |
| 7,747,657 B2 | | 6/2010 | Singh | |
| 8,281,026 B2 | * | 10/2012 | Lankford et al. | 709/231 |
| 8,532,464 B2 | * | 9/2013 | Randall | 386/248 |
| 2004/0044473 A1 | * | 3/2004 | Leem | 701/211 |
| 2004/0133858 A1 | * | 7/2004 | Barnett et al. | 715/530 |

(Continued)

OTHER PUBLICATIONS

Holloway et al., "SharePoint 2007 and Office Development Expert Solutions", 38 pages provided (Wrox 2007).*

(Continued)

*Primary Examiner* — Laurie Ries
(74) *Attorney, Agent, or Firm* — Rachael Vaughn; Brian Haslam; Micky Minhas

(57) ABSTRACT

Techniques to create structured documents and document templates using enhanced content controls are described. An apparatus may comprise an application to generate a document from a document template. The application may comprise a document template component operative to retrieve a document template comprising multiple document parts. The application may further comprise a content control component operative to manage a content control embedded in a document part of the document template. The content control may be associated with a data source arranged to store richly formatted content presented by the content control without necessarily requiring the data storage to be written in any particular way. The content control component may synchronize any changes to the formatted content between the content control and the data store. Other embodiments are described and claimed.

20 Claims, 15 Drawing Sheets

(56) References Cited

U.S. PATENT DOCUMENTS

| | | | |
|---|---|---|---|
| 2004/0172616 | A1 | 9/2004 | Rothschiller et al. |
| 2005/0114765 | A1* | 5/2005 | Gudenkauf et al. ........... 715/523 |
| 2005/0171966 | A1 | 8/2005 | Rath et al. |
| 2006/0150085 | A1* | 7/2006 | Davis et al. .................... 715/513 |
| 2007/0150806 | A1* | 6/2007 | Hartmann ..................... 715/523 |
| 2007/0203922 | A1 | 8/2007 | Thomas |
| 2007/0245235 | A1 | 10/2007 | Singh et al. |
| 2008/0250052 | A1* | 10/2008 | Jones et al. .................... 707/102 |
| 2008/0313532 | A1 | 12/2008 | Dames et al. |
| 2009/0006936 | A1 | 1/2009 | Parker et al. |
| 2009/0031279 | A1 | 1/2009 | Budinsky et al. |
| 2010/0077410 | A1* | 3/2010 | Graser et al. .................. 719/330 |
| 2012/0260162 | A1* | 10/2012 | Abel et al. .................... 715/255 |

OTHER PUBLICATIONS

Tyson, "Microsoft Word 2007 Bible", 20 pages provided (Wiley 2007).*

White, "Using Nested Content Controls for Data and Content Extraction from Open XML WordprocessingML Documents", 2 pages (Mar. 2, 2010) available at http://blogs.msdn.com/b/ericwhite/archive/2010/03/02/using-nested-content-controls-for-data-and-content-extraction.aspx.*

Author Unknown, "Using XML in Excel", retrieved at <<http://office.microsoft.com/en-us/excel-help/using-xml-in-excel-HA001189530.aspx>>, Copyright 2011 Microsoft Corporation, Retrieved Date: Apr. 18, 2011, but believed to be published prior to Mar. 2011, 10 pages.

"International Search Report", Mailed Date: Oct. 23, 2012, Application No. PCT/US2012/029687, Filed Date: Mar. 19, 2012, pp. 9.

\* cited by examiner

SYSTEM 100

DOCUMENT TEMPLATE 130

DOCUMENT PART 132-1

CONTENT CONTROL 134-1

PRESENTATION FIELD 136-1

CONTENT CONTROL 134-2

PRESENTATION FIELD 136-2

CONTENT CONTROL 134-3

CONTENT CONTROL 134-b

PRESENTATION FIELD 136-c

DOCUMENT
132-2

DOCUMENT
132-a

SELECT A FIRST CONTENT CONTROL FOR A DOCUMENT PART OF A DOCUMENT TEMPLATE;
202

SELECT A SECOND CONTENT CONTROL FOR THE DOCUMENT PART OF THE DOCUMENT TEMPLATE, THE SECOND CONTENT CONTROL NESTED WITHIN THE FIRST CONTENT CONTROL
204

MODIFY A VISUAL PROPERTY OF THE SECOND CONTENT CONTROL RELATIVE TO THE FIRST CONTENT CONTROL TO DISTINGUISH THE SECOND CONTENT CONTROL FROM THE FIRST CONTENT CONTROL WHEN PRESENTED ON A DISPLAY
206

602
A CONTENT CONTROL.

604 TITLE
A CONTENT CONTROL.

606 TITLE
◁ TITLE   CLICK HERE TO ENTER TEXT.   TITLE ▷

608
◁ TITLE   A CONTENT CONTROL.   TITLE ▷

*FIG. 6*

TECHNIQUES TO CREATE STRUCTURED DOCUMENT TEMPLATES USING ENHANCED CONTENT CONTROLS

RELATED APPLICATION

This application claims priority to U.S. Provisional Patent Application Ser. No. 61/468,473 entitled "Techniques To Create Structured Document Templates Using Enhanced Content Controls" filed on Mar. 28, 2011, which is incorporated herein by reference in its entirety.

BACKGROUND

Productivity application programs may be used to create customized document templates with structured and reusable content. A document template may include a collection of reusable document parts, with each document part having a specifically-designed presentation format and type of content. The customized document template can then be used as a starting point to create a highly structured document. For instance, a company may create a report template with customized document parts, such as a first field for a title, a second field for a date, a third field for an image, and so forth. Individuals within the company may then repeatedly use the report template to generate company reports with a uniform company format and desired set of content.

Customized document parts may be created in a number of different ways, such as by using custom-defined content controls, markup languages, bookmarks, fields, styles, and so forth. Despite improvements in developer tools available to create custom document parts for structured document templates, however, entities such as businesses are constantly driving towards producing document templates capable of producing documents with increasing levels of richly-formatted content. As such, conventional developer tools are having difficulty in producing document templates capable of providing such richly-formatted content, and further, maintaining a separation between a view and an object model of an underlying application program used to generate the document template. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to create documents and document templates for application programs. Some embodiments are particularly directed to techniques to create highly structured documents and document templates for productivity application programs using enhanced content controls.

In one embodiment, for example, a method may comprise selecting a first content control for a document part of a document template, selecting a second content control for the document part of the document template, the second content control nested within the first content control, and modifying a visual property of the second content control relative to the first content control to distinguish the second content control from the first content control when presented on a display. Other embodiments are described and claimed.

In one embodiment, for example, an apparatus may comprise a logic device and an application operative on the logic device to generate a document from a document template. The application may comprise, among other parts, a document template component operative to retrieve a document template comprising multiple document parts. The application may further comprise a content control component operative to manage a content control embedded in a document part of the document template. The content control may be associated with a data source arranged to store richly formatted content presented by the content control. The richly formatted content can have all the richness in formatting supported by the native application. The content control component may synchronize any changes to the formatted content between the content control and the data store. In addition, the content control component may control automatically repeating structures replicated from the data store to a document (e.g., rows in a table, new rows added for each data item, and so forth). The application may still further comprise a document generator component operative to generate the document from the document template with the content control. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 1B illustrates an embodiment of a document template.

FIG. 2 illustrates an embodiment of a logic flow for the system of FIG. 1.

FIG. 6 illustrates various embodiments of content controls.

DETAILED DESCRIPTION

Figure 1A:
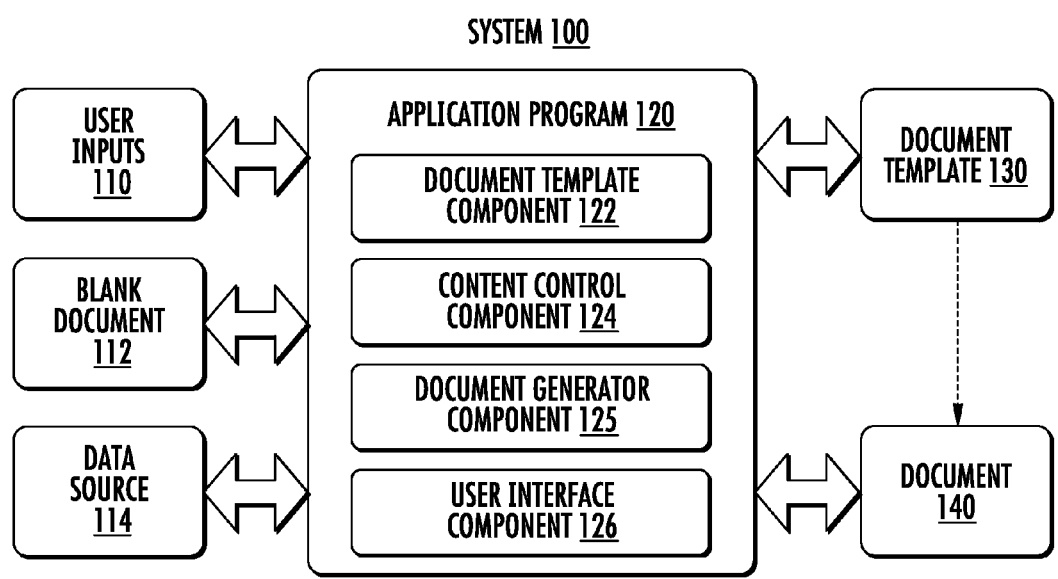
FIG. 1A illustrates an embodiment of a system to design a document template.

Various embodiments are directed to techniques to create structured document templates for application programs. Some embodiments are particularly directed to techniques to create structure document templates by defining various document parts of the document templates using an enhanced set of content controls. The enhanced content controls may be implemented for any application program, including word processing application programs, spreadsheet application programs, presentation application programs, and other application programs.

Customized document parts for a document template may be created in a number of different ways. For instance, existing application programs can produce documents using markup up language techniques, such as using custom-defined extensible markup language (XML) schemas to provide semantic markup around contents within a word processing document, a spreadsheet document, a presentation document, and other productivity applications. An XML schema is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints. XML schemas provide semantic markup around contents within a document template. This functionality allows developers to create solutions which leverage custom XML embedding to work directly against the structure and content of their data, rather than requiring a solution that handles the complexities of a presentation format of the underlying application program.

This powerful functionality allows developers to create solutions which leverage this custom XML embedding to work directly against the structure and content of their data, rather than requiring a solution that handles the complexities of a presentation format of the underlying application program. For instance, if a user were to create a cover page for an equity research note in a word processing application program which is not XML-capable, extracting useful data from the cover page (e.g., a company name, stock ticker symbol, and stock rating) would need use of an object model for the application, which is intimately tied to the presentation format of the document. This necessarily means that any resulting solution logic is also tied to the presentation format of the document, and subject to failure if that presentation were to change. For example, if the solution code expects a ticker symbol to be in column 3, row 2 of a first table, adding a new row or column would break this logic. With modern applications, however, solution code can now be linked to a structure for the customer's own data, thereby removing the need for solution logic to be tied to the presentation format of an underlying application. Rather, that same logic could search for contents of an XML node (e.g., <stockSymbol/>) and edit it directly, even if its contextual presentation had changed drastically. This leads to a greater separation between a view and model used to store the underlying data.

Custom XML schemas, however, are complex and therefore expensive to implement and maintain. Custom XML schemas also have limitations that prevent use with a wide range of richly-formatted documents. As such, developers are seeking alternatives and/or augmentations to custom XML schemas, such as using custom-defined content controls, bookmarks, fields, styles, and so forth. Of the existing alternatives, developers are migrating towards content controls as a viable replacement for custom XML schemas. Content controls are particularly well suited to creating document templates as they were specifically designed to facilitate creation of highly structured documents, and already have deep integration with custom XML parts that are stored along with a document file, thereby providing powerful data/view separation. For example, to ensure specific types of content are placed in each defined field, content controls may be used to restrict a type of information placed in defined fields. Returning to the report template example described above, a first content control may be placed on the first field used for a title to ensure that only text can be entered into the first field, a second content control may be placed on the second field to ensure only numbers in a specific format can be entered into the second field, and a third content control may be placed on the third field to ensure only an image can be loaded into the third field. This is merely a few simple examples of using content controls, and more complex scenarios exist as well.

Conventional content controls, however, may not be suitable for developing richly-formatted document templates. For instance, some document templates may have a significant amount of nesting of content controls in a document template. This makes designing and using a document template more difficult. Further, content controls typically cannot present certain types of information very well, such as text presented with certain formatting options (e.g., bold, italics, underline, colors, etc.) or style options. This type of information is sometimes referred to a "rich text" to distinguish from text with little or no formatting and/or style options, sometimes referred to as "plain text." In addition, content controls themselves are becoming more robust, such as a date content control that automatically presents a calendar as an input selection tool. Such complex content controls may implement increasing amounts of logic in a document template, increasing size and complexity of the document template.

To solve these and other problems, embodiments may implement an application program with enhanced content controls. The enhanced content controls may augment or replace existing content controls to facilitate development of highly structured and richly-formatted document templates. The enhanced content controls provide significant improvements over existing content controls. For instance, the enhanced content controls visually scale to a nesting level used in existing solutions. This provides greater levels of visual distinction and prevents the document from appearing "cluttered." In addition, the enhanced content controls can present richly-formatted information, such as rich text, and synchronize any changes to rich text between the enhanced content control and a data source associated with the enhanced content control (e.g., an XML part). In another example, enhanced content controls in tables can be set up to repeat, and perform the corresponding actions to an XML data store, such as adding a row, adding a fragment of XML, deleting a row, deleting the XML, and so forth. In yet another example, customers can work directly against an XML data store to retrieve and set information they need from a document, including repeating data (e.g., delete XML, delete a row) and including rich content in any rich-text format, including for example MICROSOFT OFFICE XML formats (e.g., change WordprocessingML, document updates). In still another example, different types of content controls can be visually defined via selectable color-coding. In yet another example, enhanced content controls can be implemented with application programs using other developer tools, such as custom XML markup, to facilitate migration of document templates. In still another example, enhanced content controls can be used to allow content outside of tables to be "repeating" in nature (e.g., an arbitrary set of paragraphs). In yet another example, developers and users can visually identify paragraph-level and text-level (e.g., inline/block) content controls. Other advantages exist as well.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1A illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

The system 100 may comprise an application program 120. The application program 120 may comprise any application program suitable for producing a document template with enhanced content controls. Examples for the application program 120 may include without limitation a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

The application program 120 may comprise a document template component 122. The document template component 122 may be used to manage a document template 130 based on user inputs 110. The document template 130 may be generated by the application program 120, or another application program (not shown) specifically designed to generate document templates, such as MICROSOFT VISUAL STUDIO®, for example. The user inputs 110 may represent user control directives received via a user interface component 126 selecting various content controls and content control properties during creation of the document template 130.

The application program 120 may comprise a content control component 124. The content control component 124 may provide various enhanced content controls for use by the document template component 122. The content control component 124 may provide content control information and messages to the user interface component 126 to generate various user interface views to interact with a user, including receiving various user inputs 110 via a suitable input device.

The application program 120 may comprise a document generator component 125. The document generator component 125 may generate a document 140 from a document template 130. For instance, the application program 120 may receive user inputs 110 to enter information into various content controls in a document template 130. Once entered, the document generator component 125 may store the document template 130 with the received user information to form the document 140.

The application program 120 may comprise a user interface component 126. The user interface component 126 may generate various user interface views comprising various graphic user interface (GUI) elements for presenting information to a user via an output device (e.g., a display, speaker), and to receive information from the user via an input device (e.g., pointer, gesture on a touch-screen).

FIG. 1B illustrates a more detailed block diagram for the system 100. In particularly, FIG. 1B illustrates a more detailed diagram for the document template 130. In the illustrated embodiment shown in FIG. 1B, the document template 130 includes one or more document parts 132-*a*, such as document parts 132-1, 132-2. Each document part 132-*a* may represent a discrete section or portion of the document template 130.

Each of the document parts 132-*a* may comprise one or more content controls 134-*b*. For instance, the document part 132-1 illustrates content controls 134-1, 134-2. Further, a document part 132-*a* may have multiple content controls 134-*b* nested or embedded within each other, such as a content control 134-3 nested within the content control 134-2, as well as having other arbitrary content mixed in-between (e.g., text descriptions for fields, etc.). It may be appreciated that the content controls 134-*b* may be nested to any level N, where N is a positive integer, suitable for a given implementation. The embodiments are not limited in this context.

Content controls 134-*b* provide a mechanism to design documents and document templates that have features such as: (1) a user interface (UI) or GUI that has a controlled input like a form; (2) restrictions that prevent users from editing protected sections of the document or document template; and (3) data binding to a data source. Content controls 134-*b* provide a UI that is optimized for both user input and print. When a user adds a content control 134-*b* to a document part 132-*a* of a document template 130, the content control 134-*b* is typically identified by a border and a title. The content control 134-*b* may also provide a presentation field 136-*c*. The presentation field 136-*c* can be used to present different types of information, including temporary text that can provide instructions to the user. The border and the title of the content control 134-*b* may or may not appear in printed versions of the document, depending on an implementation preference, while information entered by a user into the presentation field 136-*c* does appear in the printed versions. For example, if you want a user to enter a date in a section of a document template 130, a developer can add a "date picker" content control 134-*b* to a document part 132-*a* of the document template 130. When users click the content control 134-*b*, the standard date picker UI appears. A developer can also set properties of the content control 134-*b* to set the regional calendar that is displayed and to specify the date format, for example. After the user chooses a date, the UI of the control is hidden, and only the date appears if the user prints the document.

Content controls 134-*b* may also prevent users from editing or deleting certain document parts 132-*a*. This is useful if a developer has information in a document template 130 that users are able to read but not edit, or if a developer wants users to be able to edit content controls but not delete them. Further, the content control 134-*b* may bind parts of a document template 130 or document 140 to a data source. A developer can bind content control 134-*b* to certain database fields, managed objects in a .NET Framework, XML elements that are stored in the document template 130 (or on a server), and other data sources. In document-level projects, a developer can add content control 134-*b* to a document template 130 at design time or at run time. In application-level projects, a developer can add content control 134-*b* to any open document template at run time.

Examples of content controls 134-*b* are extensive, although some examples include a building block gallery control, a check box control, a combo box control, a date picker control, a drop-down list control, a group control, a picture control, a rich text control, a plain text control, a generic content control, just to name a few. The embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may select a first content control for a document part of a document template at block 202. For example, a content control component 124 of the application program 120 may be used to select a first content control 134-1 for a document part 132-1 of a document template 130.

The logic flow 200 may select a second content control for the document part of the document template, the second content control nested within the first content control, at block 204. For example, the content control component 124 may be used to select a second content control 134-2 for the document part 132-1 of the document template 130. The second content control 134-2 may be nested within the first content control 134-1, making it difficult to distinguish start/end locations or markers for one or both of the controls 134-1, 134-2.

Figure 5:
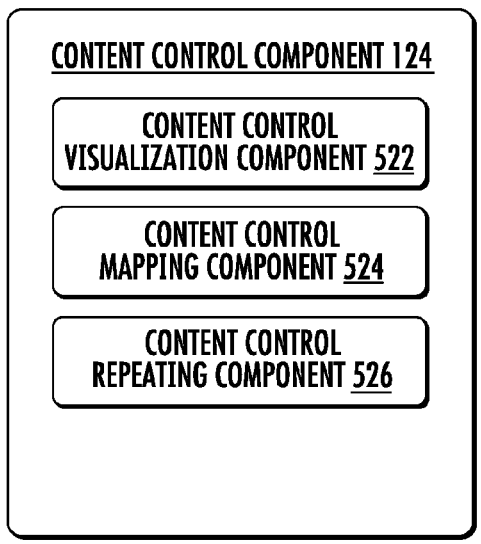
FIG. 5 illustrates a more detailed block diagram for the content control component 124 described with reference to FIG. 1.

The logic flow 200 may modify a visual property of the second content control relative to the first content control to distinguish the second content control from the first content control when presented on a display at block 206. For example, the content control visualization component 522 (as shown in FIG. 5) of the content control component 124 may be used to modify a visual property of the second content control 134-2 relative to the first content control 134-1 in order to assist in distinguishing the second content control 134-2 from the first content control 134-1 when presented on a display. For instance, various aspects of one or both of the controls 134-1, 134-2 may be varied in color, size, dimension, geometry, parts, controls, position, markers, tags, content, labels, titles, and so forth. The embodiments are not limited to this example.

Figure 3:
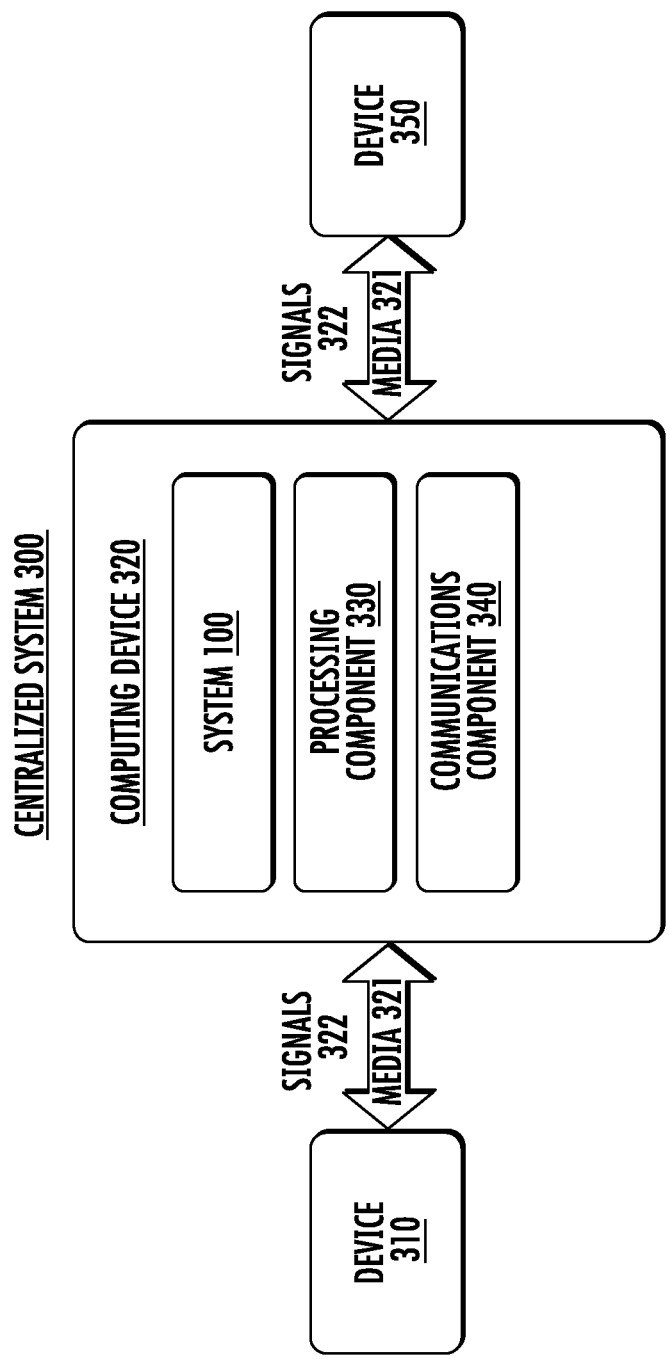
FIG. 3 illustrates an embodiment of a centralized system for the system of FIG. 1.

FIG. 3 illustrates a block diagram of a centralized system 300. The centralized system 300 may implement some or all of the structure and/or operations for the system 100 in a single computing entity, such as entirely within a single computing device 320.

The computing device 320 may execute processing operations or logic for the system 100 using a processing component 330. The processing component 330 may comprise various hardware elements, software elements, or a combination of both. Examples of hardware elements may include devices, logic devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 321 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 321.

The computing device 320 may communicate with other devices 310, 350 over a communications media 321 using communications signals 322 via the communications component 340. For example, the content control component 124 of the application program 120 may be used to insert various content controls 134-b into various document parts 132-a, with the content controls 134-b having data sources on one of devices 310, 350. For instance, the devices 310, 350 may comprise respective client, server devices.

Figure 4:
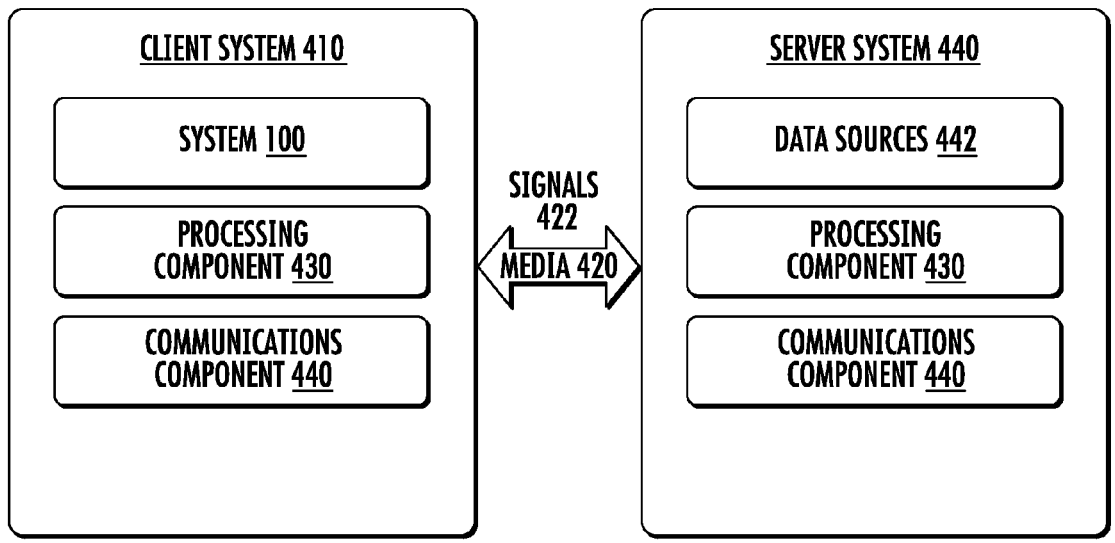
FIG. 4 illustrates an embodiment of a distributed system for the system of FIG. 1.

FIG. 4 illustrates a block diagram of a distributed system 400. The distributed system 400 may distribute portions of the structure and/or operations for the systems 100, 300 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 410 and the server system 450 may process information using the processing components 430, which are similar to the processing component 330 described with reference to FIG. 3. The client system 410 and the server system 450 may communicate with each over a communications media 420 using communications signals 422 via communications components 440, which are similar to the communications component 340 described with reference to FIG. 3.

In one embodiment, for example, the distributed system 400 may be implemented as a client-server system. A client system 410 may implement the system 100. A server system 450 may implement the data sources 442 for various content controls 134-b of various document parts 132-a of a document template 130. In one embodiment, for example, the data sources 442 may comprise XML schemas, files, code, data, or parts.

FIG. 5 illustrates a more detailed block diagram for the content control component 124 described with reference to FIG. 1. In the illustrated embodiment shown in FIG. 5, the content control component 124 may comprise a content control visualization component 522, a content control mapping component 524, and a content control repeating component 526. Each of these components are described in more detail below. It may be appreciated that the content control component 124 may include other components arranged to control various features of the content controls 134-b as desired for a given implementation. The embodiments are not limited in this context.

Content Control Visualization Component 522

FIG. 6 illustrates a user interface view 600 of various content controls 134-b produced by the content control visualization component 522. The content control visualization component 522 of the content control component 124 may render content controls 134-b in an improved manner to assist a developer in creating a document template 130, as well as assist users in filling out one or more documents generated from a document template 130. For instance, markers for content controls 134-b, when shown, may display the Title property of the content control 134-b if set, and nothing if it is blank. The markers do not show a value of the Tag property as in conventional renderings. Further, a title of a content control 134-b is shown (without the grab handle) if it is placed within a locked region of the document. It can still be dragged via the title if it is shown. The visualization of any associated error and all other acetate GUI (e.g. drop-down list UI) is left unchanged. For example, if an error exists, the content control visualization component 522 may show a red-dashed border and an error UI is placed in a normal position.

As shown, FIG. 6 illustrates an example of a rendering of a GUI element 602 for a content control 134-b when a pointer is hovered above the content control 134-b. FIG. 6 further illustrates an example of a rendering of a GUI element 604 for the content control 134-b when the content control 134-b is in focus (e.g., selected) using a human input device (HID), such as a pointing device or gesture. FIG. 6 also illustrates an example of a rendering of a GUI element 606 for a content control 134-b when in a design mode. FIG. 6 finally illustrates an example of a rendering of a GUI element 608 for a content control 134-b with start/end markers. The start/end markers of the GUI element 608 may be particularly useful when multiple content controls 134-b are embedded within each other since they reduce or eliminate the need for a handle or bounding box around each content control 134-b, thereby decreasing visual "clutter" for the nested markers and information presented within the markers.

Figure 7:
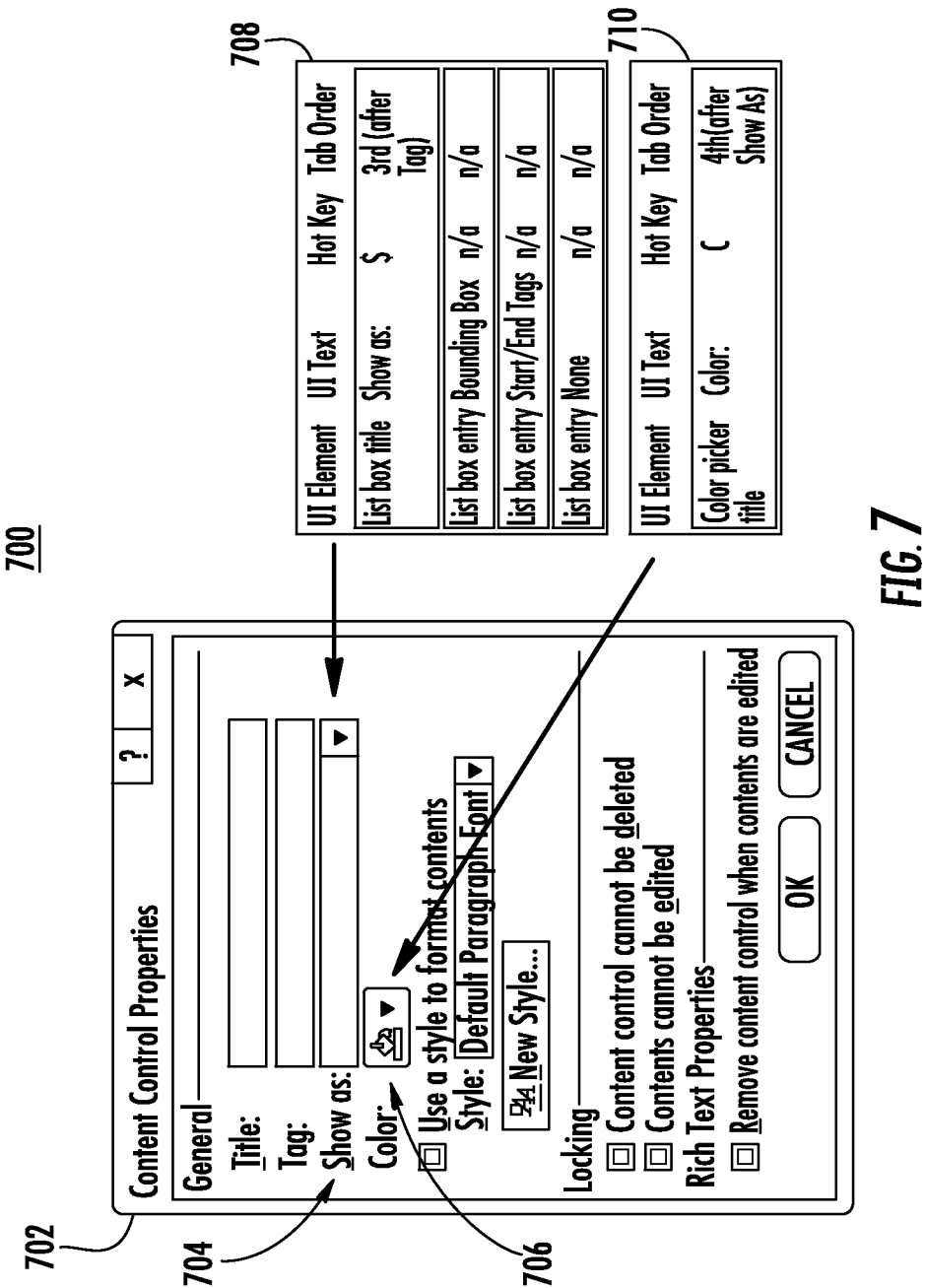
FIG. 7 illustrates a user interface view of content control properties for visualization.

FIG. 7 illustrates a user interface view 700 to manage content control properties 702 for visualization of content controls 134-b. As shown in FIG. 7, various visual properties of content controls 134-b may be selected from a drop-down box control 704 as listed in table 708. Further, different colors may be selected from a color picker control 706 for content controls 134-b as listed in table 710. Assigning different colors to content controls 134-b may help a developer keep visual track of different content controls 134-b, particularly in a nesting scenario where content controls 134-b are nested within other content controls 134-b to some level of nesting (e.g., 2, 3, 4 or more).

When a user sets the color of a content control 134-b via the color picker control 706, and if the content control 134-b is currently showing tags, the content control visualization component 522 applies a specified color to all colored regions of the tag (e.g., non black/white regions). If the content control 134-b is currently showing as a bounding box, the content control visualization component 522 uses the specified color as a line style for the bounding box, and calculates all other colors based on that color.

When a user enters a design mode for content controls 134-b, each of the three visualizations updates as follows: (1) as a shaded rectangle/bounding box (with optional title), show the bounding box/rectangle plus the start/end markers (the bounding box/title continue to disappear on loss of focus, with shading on hover, as indicated in GUI element 606; (2) start/end markers remain as start/end markers; and (3) when invisible (no visual representation), as start/end markers as indicated in GUI element 608. The start/end markers may toggle with a combination key shift (e.g., CTRL+SHIFT+X), but are typically "on" when a user enters design mode.

Content Control Mapping Component 524

In various embodiments, the content control mapping component 524 of the content control component 124 may be arranged to handle cases where presentation within a content control 134-b comprises richly-formatted content. In one embodiment, for example, the richly formatted content can have all the formatting richness, options, features, functionality, capabilities, or properties supported by a given native application. In this case, the formatting of the text is part of the data, as well as the presentation, and therefore it is desirable that the data contain the full representation of that rich formatting. To accomplish this, a binding between a content control 134-b and a data source 442 may be arranged to transmit richly-formatted information in a format agnostic of the structure of the custom XML data stored separately from the document template 130.

As described with reference to FIG. 1, the application program 120 may comprise a document template component 122 operative to retrieve a document template 130 comprising multiple document parts 132-a. The application program 120 may further comprise a content control component 124 operative to manage a content control 134-b embedded in a document part 132-a of the document template 130. The content control 134-b may be associated with a data source 442 arranged to store formatted content presented by the content control 134-b. The content control mapping component 524 of the content control component 124 may synchronize any changes to the formatted content between the content control 134-b and the data store 442. The application program 120 may also comprise a document generator component 125 operative to generate a document 140 from the document template 130 with the content control 134-b.

The document template component 122 may retrieve a document template 130 comprising multiple document parts 132-a, as described with reference to FIG. 2. A document part 132-a may include one or more content controls 134-b implemented separately (e.g., content controls 134-1, 134-2) or nested within each other (e.g., content controls 134-2, 134-3).

The content control component 124 may manage a content control 134-b embedded in a document part 132-a of the document template 130. The content control 134-b may be associated with a data source 442 arranged to store formatted content presented by the content control 134-b in a presentation field 136-c. The formatted content may comprise any richly-formatted content or rich text content comprising, such as text with certain formatting options or style options selected by a user. For instance, the formatted content may comprise a word or phrase of a certain font that has been bolded or italicized to change its visual properties.

Whenever the document template 130 is presented by a digital display, a content control 134-b may present temporary text with instructions for a user in a presentation field 136-c. For instance, the temporary text may indicate that a user can enter a name for a form. A user may select the presentation field 136-c, and enter information into the presentation field 136-c to replace the temporary text. Further, the user may format the information according to a given set of user preferences, to form a set of formatted content. When this occurs, the content control component 124 may receive user input 110 in the form of control directives to modify the formatted content, the control directives comprising instructions to modify a formatting option or a style option for the formatted content. Examples of a formatting option or style may include without limitation a font, a font style, a font size, a font color, an underline style, an underline color, an effect, a text effect, a text fill, a text outline, an outline style, a text shadow, a text reflection, a text glow, a text edge, a text three dimensional format, and so forth. The embodiments are not limited in this context.

Additionally or alternatively, a content control 134-b may present information stored by a data source 442. For instance, assume content controls 134-1, 134-2 are bound to a data source 442 storing names and addresses for employees. The content control 134-1 may present a name for an employee in a presentation field 136-1. Similarly, a content control 134-2 may present an address for an employee in a presentation field 136-2.

The content control mapping component 524 of the content control component 124 may synchronize any changes to the formatted content between the content control 134-b and the data store 442 regardless of whether the contents of the data store were designed to accept formatted content. It is worthy to note that the rich-text binding does not necessarily need the data store 442 to be written in any special way to accommodate the formatted content. Whenever a change is made to either a presentation field 136-c of the content control 134-b or a data store 442 associated with the content control 134-b, the changes are synchronized to maintain data consistency between both the content control 134-b and the data store 442. Further, the synchronization is performed in a manner to retain full-fidelity of the richly-formatted content.

In one embodiment, for example, the content control mapping component 524 of the content control component 124 may receive user inputs 110 as control directives to modify formatted content presented by a content control 134-b, present the modified formatted content in a presentation field 136-c of the content control 134-b, and send the modified formatted content to the data store 442. The data store 442 may receive the modified formatted content, process the modified formatted content to match a data schema used to store the formatted content, and overwrite the formatted content with the modified formatted content.

In one embodiment, for example, the content control mapping component 524 of the content control component 124 may detect that formatted content stored in the data store 442 has been modified. The content control mapping component 524 may send the modified formatted content to the content control 134-b for presentation in a presentation field 136-c of the content control 134-b. The modified formatted content may be presented in the presentation field 136-c with full-fidelity of the richly-formatted content.

To accomplish this, a binding between a content control 134-b and a data source 442 may be arranged to transmit richly-formatted information in a format agnostic of the structure of the custom XML data stored separately from the document template 130. For instance, the content control mapping component 524 may communicate the modified formatted content using a data schema different from a data schema of the formatted content stored in the data store.

In one embodiment, the data store 442 may be arranged to store the formatted content according to an XML data schema. In this case, the content control mapping component 524 may serialize XML elements of the formatted content to form a string of XML elements, escaping the resulting string to remove reserved XML characters from the string of XML elements, and store any remaining text from the XML elements in the data store. The serialization operations may be described in more detail with reference to FIG. 8.

Figure 8:
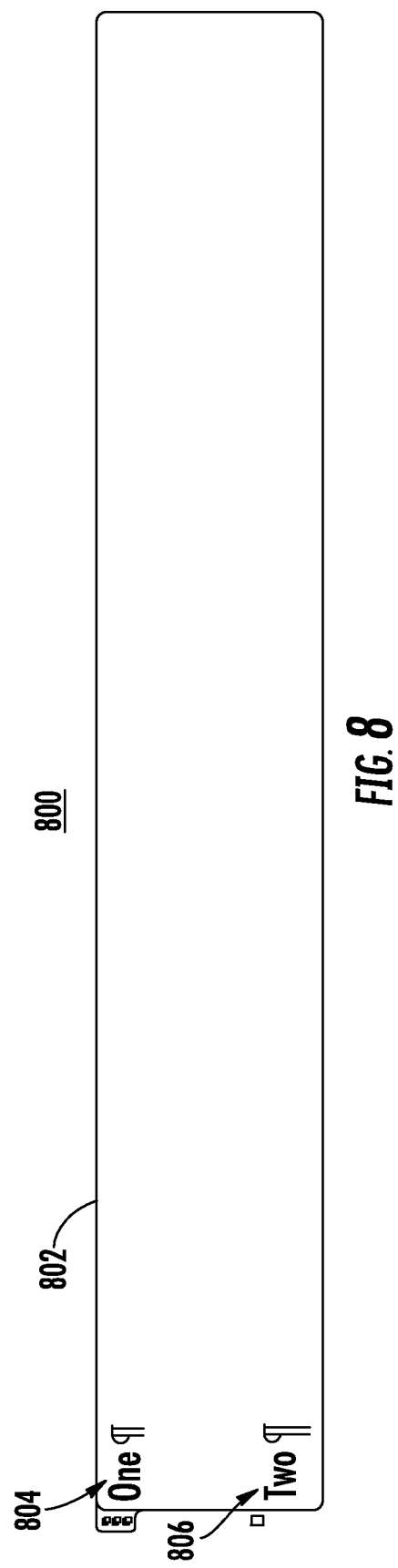
FIG. 8 illustrates a user interface view of content control output.

FIG. 8 illustrates a user interface view 800 of certain content control output. The content control mapping component 524 may allow developers to map content of rich text content controls and document building block content controls to an XML datastore (e.g., data sources 442). When a mapping is active, the associated custom XML node contains a serialized representation of the specified range of the document template 130. This is created by retrieving a text-based serialized or flat XML representation of the range, escaping the resulting string to remove reserved XML characters as shown in TABLE 1 below, and storing the resulting text in a corresponding node.

TABLE 1

| | |
|---|---|
| < | < |
| > | > |
| " | " |

TABLE 1-continued

|   |   |
|---|---|
| '  | ' |
| &  | & |

Whenever the value of the text in the document template 130 changes and the user: (1) leaves the context of that content control 134-b by clicking outside of it; (2) takes focus away from the application program 120; and (3) saves the document template, the content control mapping component 524 generates the serialized representation and pushes the result into the content control 134-b. Correspondingly, whenever the value of the string in the node changes, the content control mapping component 524 un-escapes the resulting string, and attempts to insert it as contents of the content control 134-b.

The last paragraph of the XML markup (e.g., WordprocessingML) equates to the ending paragraph of the content control 134-b (if one exists), so XML like this:

```
<w:p><w:r><w:t>One</w:t></w:r></w:p>
<w:p>...<w:pStyle
val="Heading1"/>...<w:r><w:t>Two</w:t></w:r></w:p>
``` would be inserted into the content control 134-b as illustrated by the GUI elements 804, 806 in a bounding box 802.

The content control mapping component 524 may also handle error cases. For instance, if the XML is not valid XML (e.g., well-formed), the content control mapping component 524 breaks the mapping and nothing in the document template 130 is updated. Subsequent edits to the document contents will resuscitate the link and overwrite the node's content. If the XML contains multiple paragraphs and the content control 134-b is inline (e.g., not block level), the content control mapping component 524 first attempts to insert paragraph marks before or after the content control 134-b as needed to make it block level. If that fails, the content control mapping component 524 performs the same logic as paste into a plain text content control does today—paragraphs convert into carriage returns, and the paragraph formatting from the first paragraph to the contents of the entire control. If a custom XML node containing rich content is already bound to a plain text content control, the XML mapping is not allowed and fails with a message "The custom XML node is already mapped to a plain text content control, so it can't be mapped to a rich text content control." On file open, if a node is bound in this way, the content control mapping component 524 fails to connect the inner bound content control, but leave the mapping information in the file. If a mapped rich text control is nested within another mapped rich text control on open or paste, the content control mapping component 524 fails to connect the inner bound content control, but leaves the mapping information in the file. When opening a document with rich text data bindings is opened, rich text bindings resuscitate before any plain-text bindings, so that the latter can relink to the data store independently (in case their data has changed as well).

The file format representation of a rich-text data binding uses the same element names, values, etc. as the existing XML markup. However, these elements typically exist in the application program 120 namespace in order to ensure compatibility with earlier versions of the application program 120.

Content Control Repeating Component 526

Figure 9:
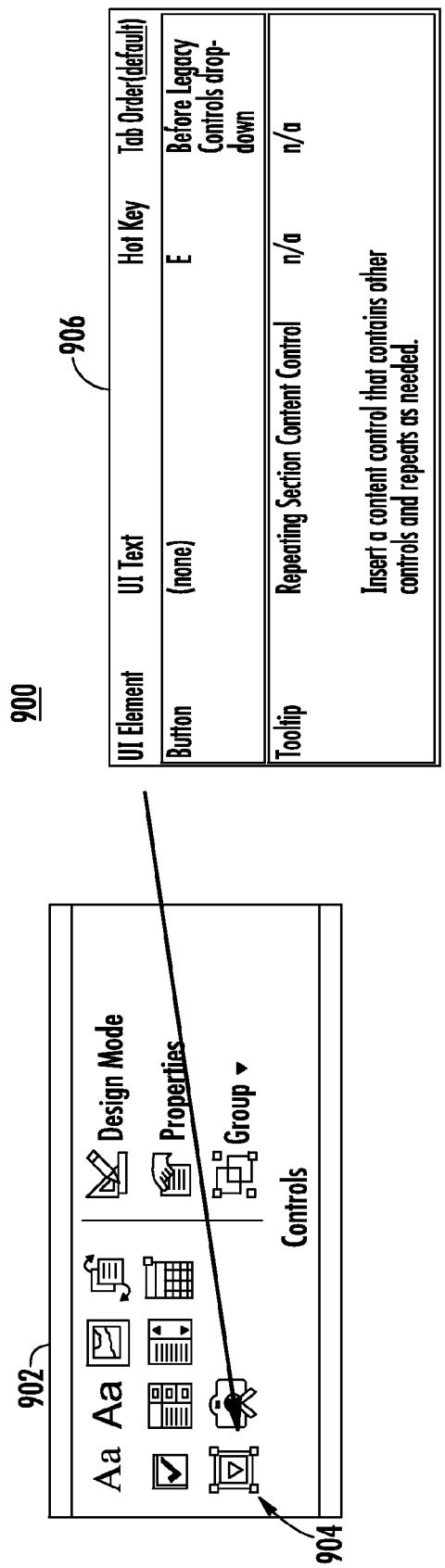
FIG. 9 illustrates a user interface view of content control selections.

FIG. 9 illustrates a user interface view 900 of content control selections to support repeating content. The content control repeating component 526 of the content control component 124 allows developers to handle constructs involving repeating content. This occurs whether or not the content is mapped to XML nodes in the XML datastore. FIG. 9 illustrates a GUI ribbon 902 with a new button 904 to control repeating section content control. Actions taken on selection of the button 904 are shown in table 906.

When a repeating section content control 134-b is inserted into a document part 132-a of a document template 130, the repeating section content control 134-b may be around one or more paragraphs/rows/tables. The repeating section content control 134-b is valid around multiple contiguous rows that do not comprise a whole table, unlike any other type of content control 134-b. The repeating section content control 134-b does not typically have placeholder text unlike other types of content controls 134-b. When inserted into an empty paragraph, for example, the repeating section content control 134-b simply surrounds nothing, although it may optionally have instructional text to tell the template author to add real content to be repeated.

Figure 10:
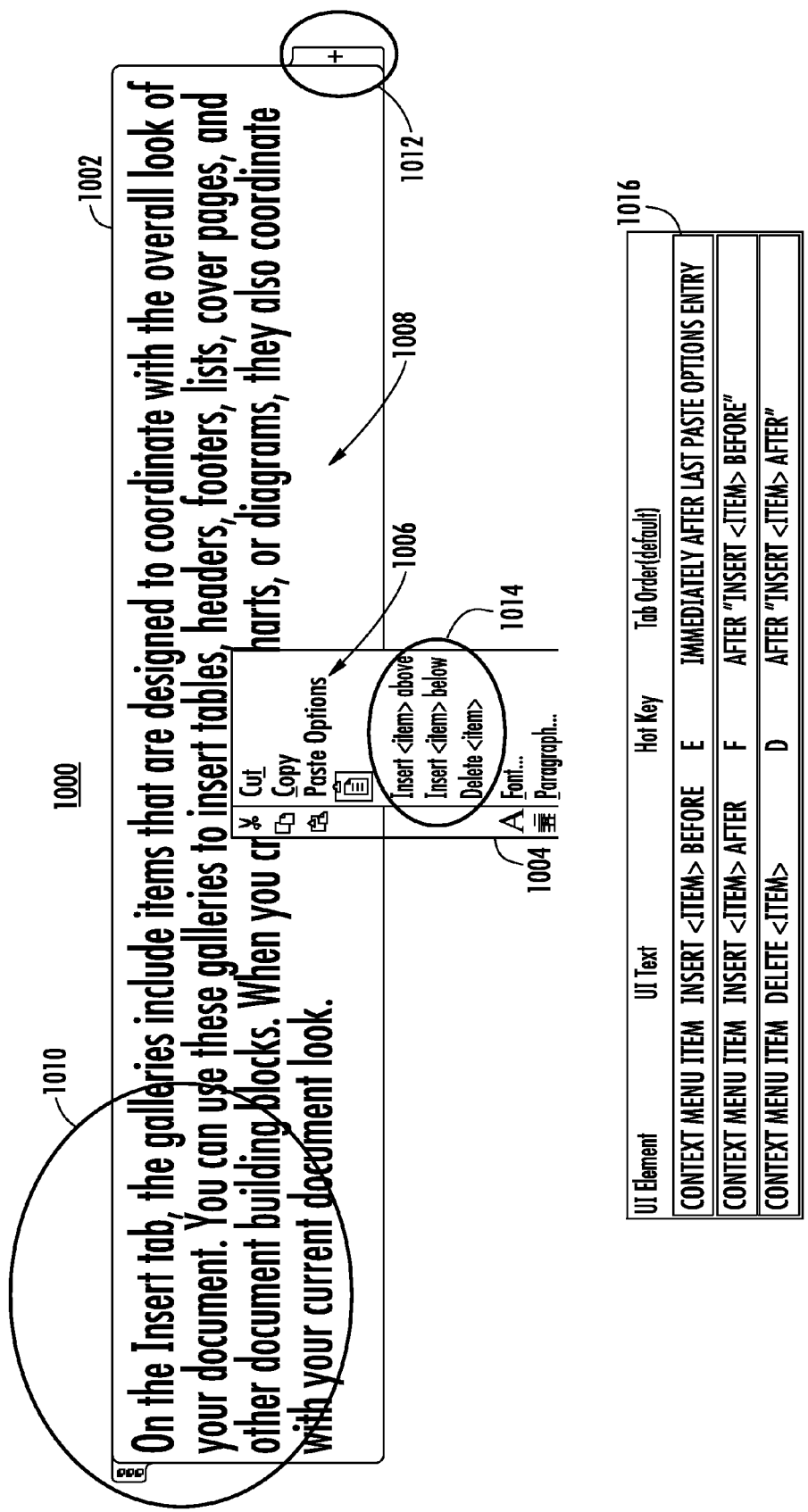
FIG. 10 illustrates a user interface view of content control selections.

FIG. 10 illustrates a user interface view 1000 of content control selections for a repeating section content control 134-b. A repeating section content control 134-b inserted into a document part 132-a has a unique GUI, as shown in FIG. 10. First, a tag is placed around the entire set of repeating sections 1008 as indicated by circle 1010 within a bounding box 1002. For example, if there are four items in the repeating section, one pair of start/end markers is placed around the entire set of four items. Individual items have tags as well. The visibility of those tags matches the parent repeating section tags. For example, the parent visualization is "start/end markers", and so are these. Second, a control that inserts another repeating item below the current one is shown as indicated by circle 1012. This control may be placed at the bottom edge of the repeating section content control 134-b, on the trailing edge (e.g., right in LTR, left in RTL), and is sized to match a 16×16 button. Third, three additional context menu entries are added to a menu 1004 below a paste item 1006 as indicated by circle 1014. Properties of the additional context menu entries are shown in table 1016. The Insert <item> above entry inserts another repeating item above the current one. The Insert <item> below entry inserts another repeating item below the current one. The Delete <item> entry deletes the current item from the document template 130.

When the menu 1004 is populated, an <item> may be derived from the first of the following to be non-empty: (1) the Section Title property in the parent repeating item content control 134-b, the Title of the parent repeating section content control 134-b, the node of the XML mapping of the repeating section content control 134-b, or the static text "item." The Insert Before/Insert After menu entries are shown whenever the selection is contained within a repeating section item content control 134-b, and apply to: (1) Insert Before—inserts before the first repeating section item in the selection; and (2) Insert After—inserts after the last repeating section item in the selection. The Delete menu entry is shown whenever the selection is contained within a single repeating section item and applies to that item.

Figure 11:
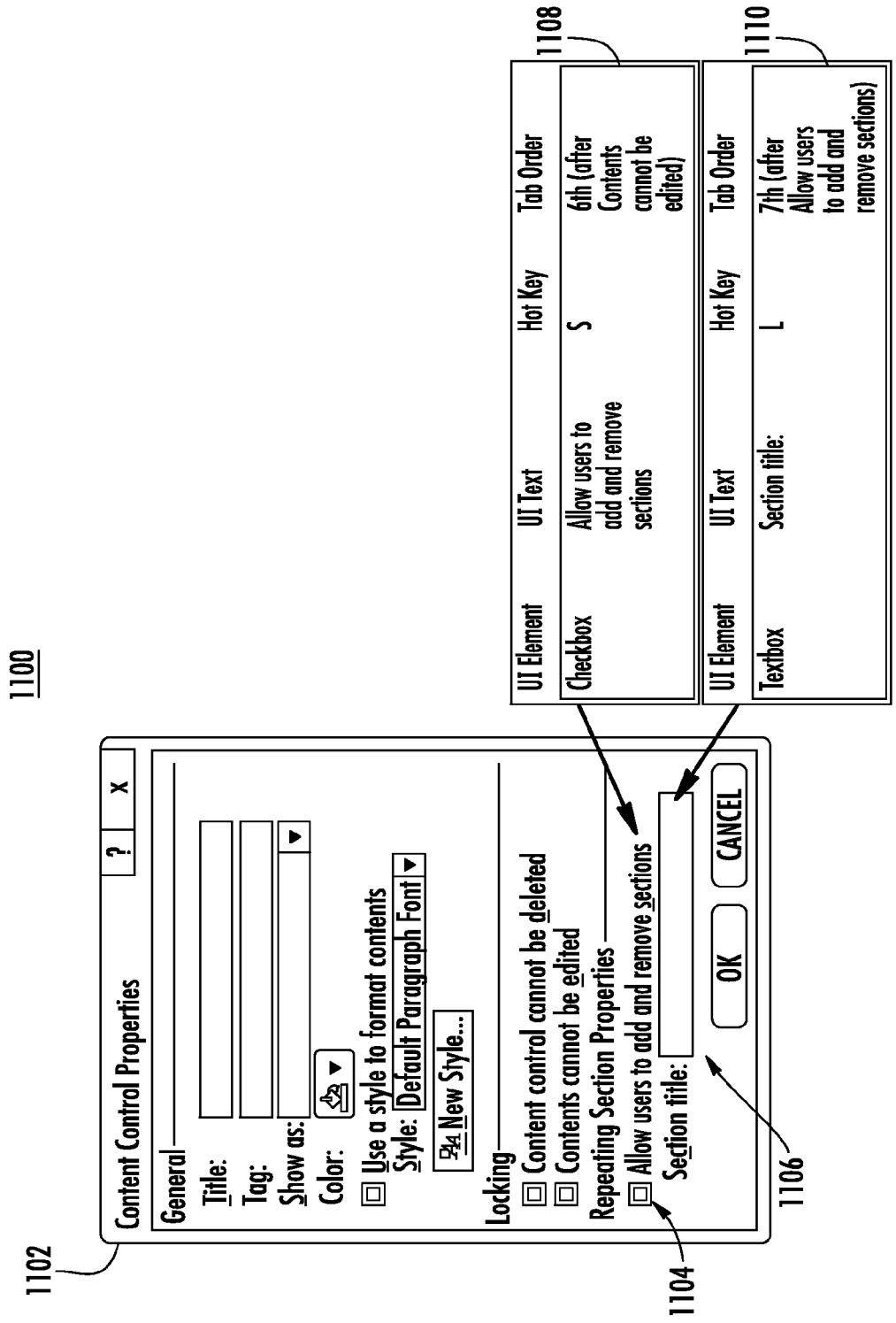
FIG. 11 illustrates a user interface view of content control properties for repeating sections.

FIG. 11 illustrates a user interface view 1100 of content control properties 1102 for repeating sections. As shown, a check box control 1104 may be used to set whether a user is allowed to add and remove sections as indicated by table 1108. A text box control 1106 may allow insertion of a section title as indicated by table 1110. The additional properties for the repeating section content control 134-b behave as follows: (1) if the "Allow users to add and remove sections" property is not set, then both the UI and the context menu entries above are suppressed; and (2) the "Section title" property is only enabled when the previous property is set. When available, it sets the value of <item> in the context menu entries described above. The existing properties of the control apply as follows: (1) the "Content control cannot be deleted" property means that the repeating section content control 134-*b* cannot be deleted, and items inside are controlled by the new item described above; (2) it also means that the user cannot delete the last item in the repeating section; when one item remains, the "Delete <item>" entry is disabled; (3) the "Contents cannot be edited" property means that only content controls inside one of the repeating sections can be edited and new items cannot be added to the repeating section; and (4) the Title/Tag properties apply to the repeating section content control.

Figure 12A:
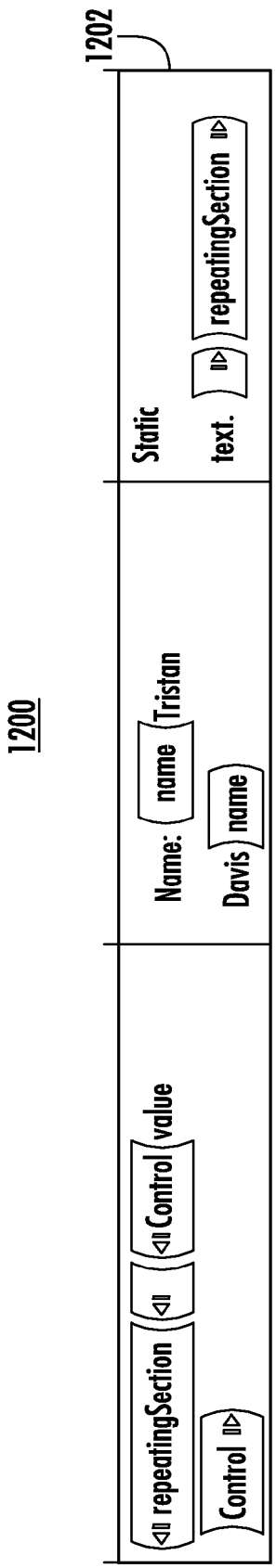
FIG. 12A illustrates a user interface view of a content control for repeating sections.
Figure 12B:
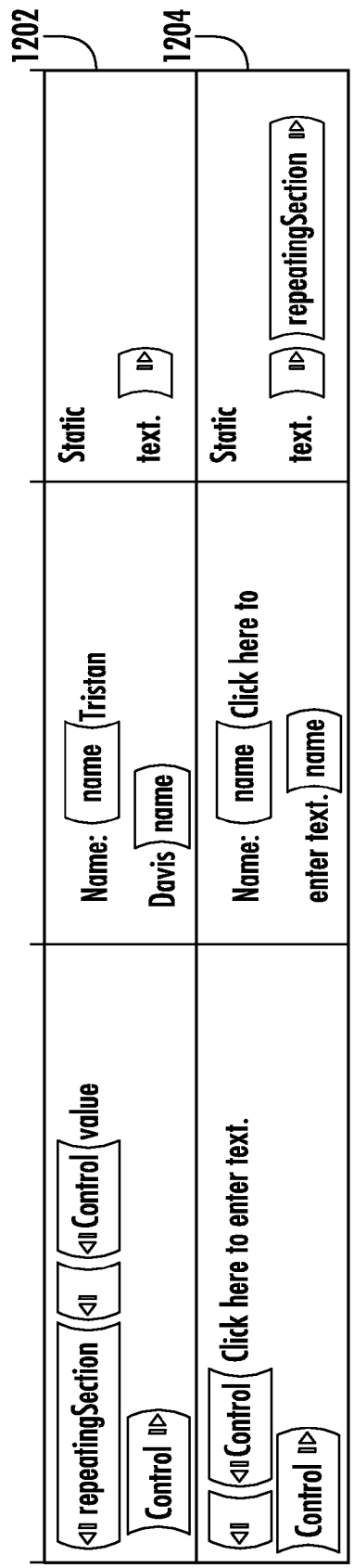
FIG. 12B illustrates a user interface view of a content control for repeating sections.

FIGS. 12A, 12B illustrate a user interface view 1200 of the repeating section content control 134-*b*. When the repeating section content control 134-*b* is inserted into a document template 130, new behaviors are applied to the repeating section content control 134-*b*. FIGS. 12A, 12B illustrate a case where a new item is added to the document template 130. When a new item is added to the document template 130, it is populated as follows: (1) the item from which this one is being added is cloned, and all content controls in that item that (a) have no child content controls, or (b) are XML mapped have their contents reset to placeholder text, except in the case of a child repeating control, which is cleared down to a single item; (2) the new content is inserted above/below the existing control as appropriate; and (3) XML mappings are reconnected per the appropriate logic. For example, assume a repeating section content control 134-*b* is shown as item 1202 in FIG. 12A. Further assume a developer chooses "Insert item above" from the menu 1004, then item 1202 would have an additional item 1204 as shown in FIG. 12B.

When an item is deleted, either via a selection that completely subsumes it, or the context menu GUI, it (and its container tags) is deleted. If the "Contents cannot be edited" property is set, then deletion is only permitted when the selection can be deleted in its entirety (e.g. if part of a previous/following item is also selected, then nothing is deleted). If the user deletes the last item in the set, then the parent repeating section control 134-*b* is deleted and cannot be recovered without pressing Undo (e.g., undoing the deletion). If the user chooses the Remove Content Control entry from the right-click menu, the repeating section content control 134-*b* and all other repeating section item content controls 134-*b* are removed. However, the datastore is not updated.

Certain command behaviors may change when editing around repeating sections. For example, certain commands may be disabled if the specified row is contained within a repeating section item. This may not occur if its entire table is contained in the item (e.g., if it is part of a nested table). Examples of disabled commands may include Split Table commands and Repeat Header Rows commands. Further, a Convert to Text command is disabled if the table contains a repeating section content control. The Merge Cells action may also be disabled if the merge crosses over the start/end tag of a repeating section item. The Sort command may be disabled if the repeating section item spans more than a single row or single paragraph. The Insert Row Above and Insert Row Below commands operate as previously described. The Split Cells command does not allow the user to change the current number of rows when opened. In addition, a user cannot type between the repeating section and repeating section item controls, or edit between adjacent repeating items within a repeating section.

When a user goes into design mode, the following logic is applied to all repeating section content controls: (1) if the repeating section content control is XML mapped, all items in the control except the first one are removed; (2) the acetate GUI, as well as the context menu items to add/remove items, are hidden. When the user exits design mode, the following occurs: (1) if the repeating section content control is XML mapped, the single instance of the repeating section is repeated to match the number of items in the data store; and (2) the acetate/context menu reappears where appropriate.

For XML mappings inside of a repeating section, the content control mapping component 524 and/or the content control repeating component 526 maps them as follows: (1) if the mapping does not intersect with an item in the node set as part of its parent chain, then the binding is an "absolute binding" and shows the same content in all repeating section items; (2) if the mapping does intersect with an item in the node set as part of its parent chain, then the binding is a "relative binding." In the latter case, the binding is remapped as follows: (1) the absolute binding for the node is determined (flattening out any query expressions)—this should happen on initial mapping; (2) the axis of the binding that intersects with the node set is removed; and (3) the remainder of the path is evaluated relative to the path of the repeating section content item.

When a repeating section item is added to the document, the XML fragment for the repeating section content item from which this one is being added is cloned. Further, all leaf XML nodes and attributes within in have their values reset to the empty string, and the new XML sub tree is added at the appropriate place in the XML DOM, either immediately before or after the existing XML fragment. In addition, all XML mappings in the corresponding repeating section content item are mapped relative to this new XML fragment. For error cases, if the insertion fails because of a structural schema error (e.g., maxOccurs=2 and the user inserts the 3rd item), the content control mapping component 524 rolls back the insertion in the XML and in the document template 130 and issues a failure message as follows: "Another <item> cannot be added to the document." The <item> is populated using the logic previously described above.

Figure 13:
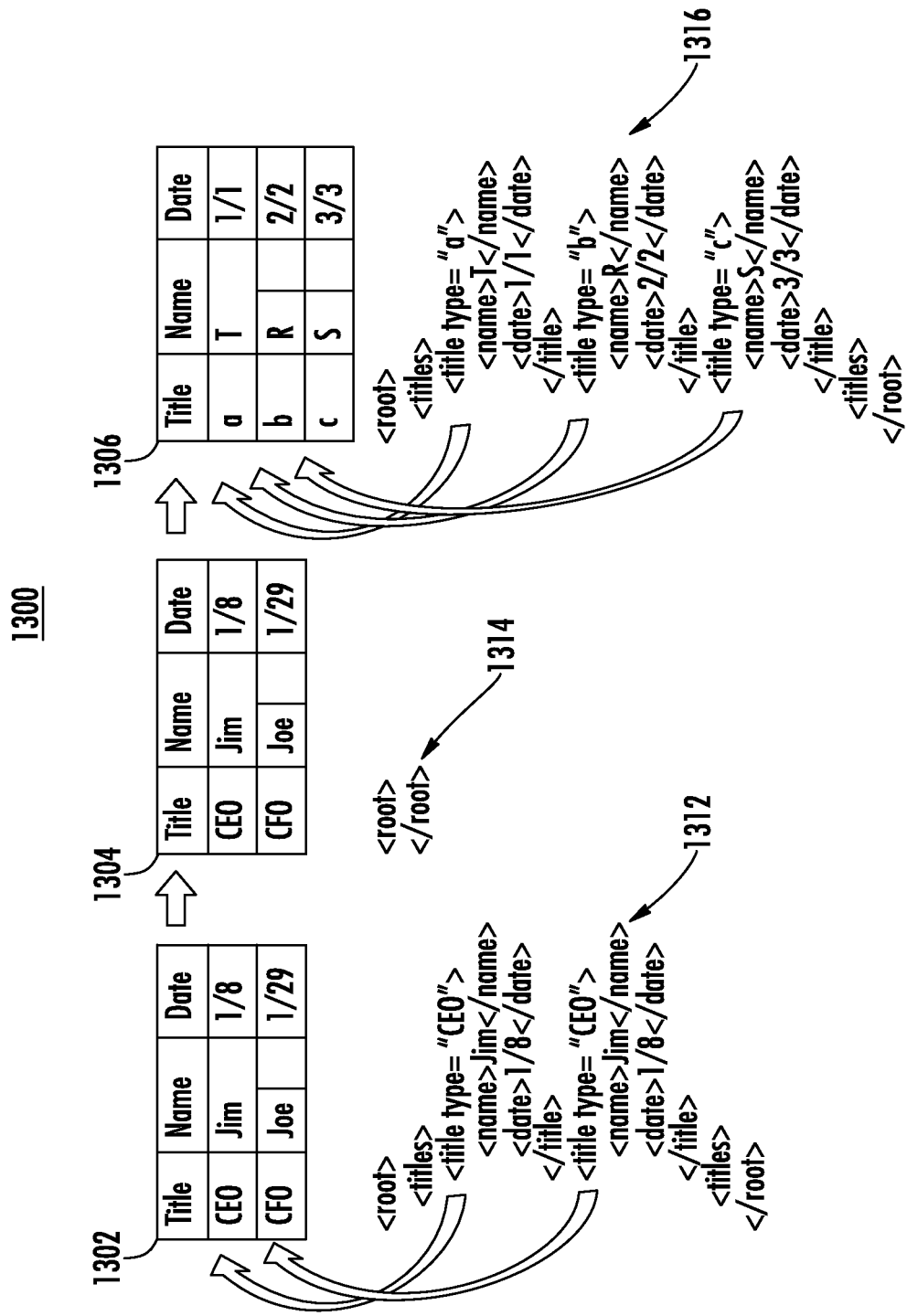
FIG. 13 illustrates an example of when a repeating section is deleted.

FIG. 13 illustrates a logical diagram 1300 illustrating a case where a repeating section is deleted. As shown in the logical diagram 1300, when a repeating section item is deleted from the document template 130, the XML fragment for the repeating section item is removed from the XML DOM in the datastore. The XML fragment remains on the undo stack/clipboard, so it can be cut/pasted within the parent repeating section and undone. If a replace subtree happens on the nodeset (or any of its ancestors), the repeating section is disconnected, the replace action is performed, and it is hooked back up. This prevents losing all of the repeating section items during the replace.

The logical diagram 1300 provides an example of deleting a repeating section item. The repeating section content control 134-*b* is mapped to a nodeset with two values as indicated by item 1302 and code 1312. Assume a replace subtree operation occurs on <titles>. The repeating section is unbound before the nodes disappear as indicated by item 1304 and code 1314. When they are re-added, the mapping is reconnected, rows 1 and 2 remap to their new items, and row three is cloned from row two, as indicated by item 1306 and code 1316.

For error cases, if the deletion fails because of a structural schema error (e.g., minOccurs=2 and the user deletes one of the last two items), the deletion is rolled back in the XML and in the document template 130 and a failure message is generated as follows: "This <item> cannot be deleted from the document." The <item> is populated using the previously described logic. On open, if the nodeset evaluates to an empty set, it is not treated like a delete action. Rather, the items in the repeating section remain, but are unlinked from the data store. Once a single node appears in the node set (subject to the replacement logic above), mappings are connected and items added/removed as needed.

The following behaviors apply to cut/copy/paste actions involving repeating sections. When a repeating section control is cut in its entirety, no change is made to the data store. Whenever repeating section item content controls are moved via copy and paste, the corresponding XML nodes are moved in the XML data store. When the item is cut, the mapped node is removed from the XML data store. When the item is pasted, the mapped node is inserted as appropriate in the XML data store (e.g. if it is inserted after the 2nd item, the subtree is inserted directly after the XML node mapped to that item) if it is pasted into a compatible repeating section (e.g., one bound to the same nodeset); else, the XML that was cut is discarded.

In summary, or in addition to, the embodiments described above may include enhanced content controls that provide a capability to have presentation formats that are defined on a per-control basis. Further, the enhanced content controls may be changed dynamically at runtime. In addition, the enhanced content controls may be mapped to a set of nodes rather than to just a single node. Still further, the enhanced content controls may be mapped to just add new presentation data (including other content controls), rather than replace what is currently there.

Figure 14:
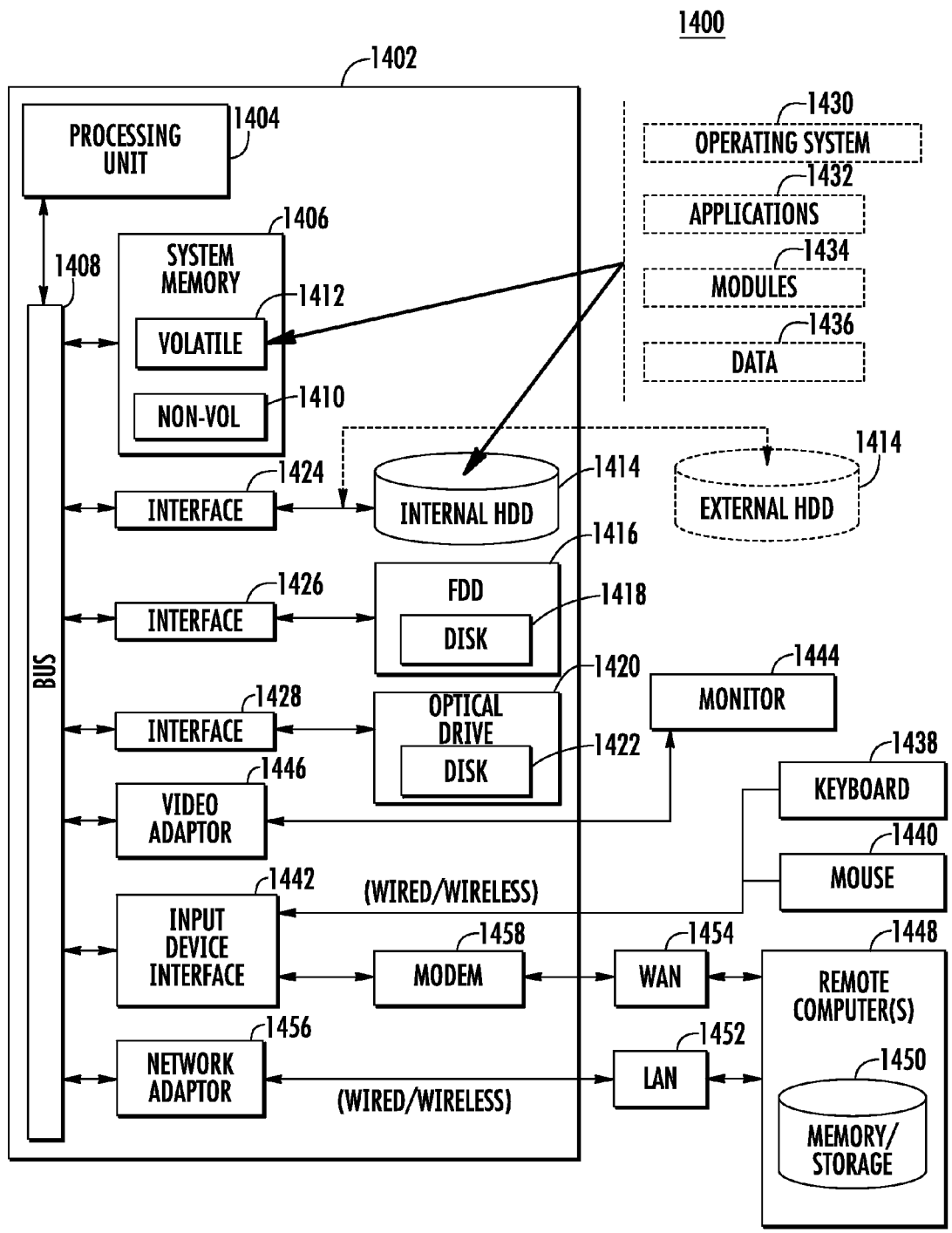
FIG. 14 illustrates an embodiment of a computing architecture.

FIG. 14 illustrates an embodiment of an exemplary computing architecture 1400 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1400 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1400 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors. Dual microprocessors and other multi-processor architectures may also be employed as the processing unit 1404. The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436.

The one or more application programs 1432, other program modules 1434, and program data 1436 can include, for example, the systems 100, 200, the application program 120, the document template component 122, the content control component 124, the user interface component 126, the document template 130, the content control visualization component 522, the content control mapping component 524, the content control repeating component 526, and other features and components of the systems 100, 200.

A user can enter commands and information into the computer 1402 through one or more wire/wireless input devices, for example, a keyboard 1438 and a pointing device, such as a mouse 1440. Other input devices may include a microphone, an infra-red (IR) remote control, a joystick, a game pad, a stylus pen, touch screen, or the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 15:
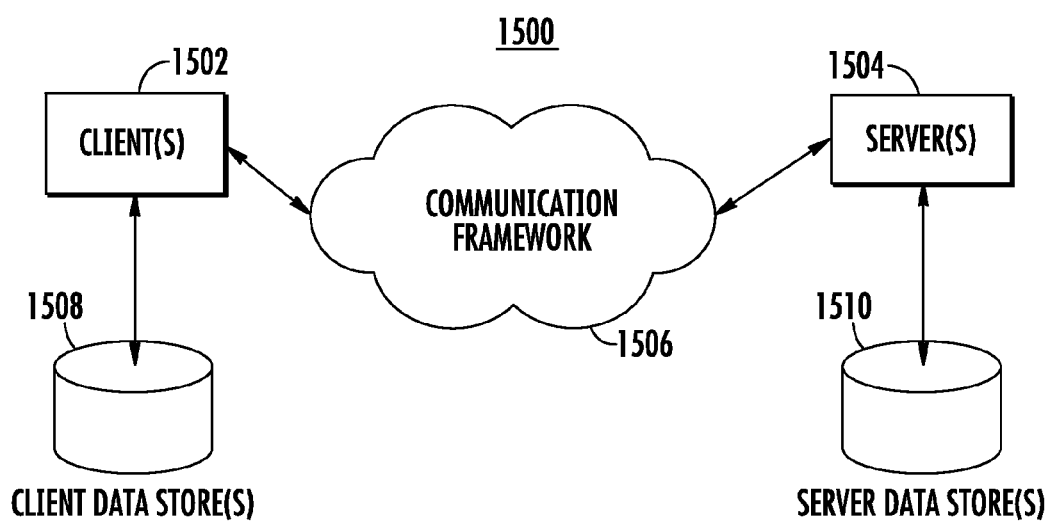
FIG. 15 illustrates an embodiment of a communications architecture.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, and so forth. The embodiments, however, are not limited to implementation by the communications architecture 1500.

As shown in FIG. 15, the communications architecture 1500 comprises includes one or more clients 1502 and servers 1504. The clients 1502 may implement the client systems 310, 400. The servers 1504 may implement the server system 350. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 may communicate information between each other using a communication framework 1506. The communications framework 1506 may implement any well-known communications techniques and protocols, such as those described with reference to systems 300, 400. The communications framework 1506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected"

along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a logic device; and
   an application operative on the logic device to generate a document from a document template, the application comprising:
   a document template component operative to retrieve the document template, the document template comprising multiple document parts;
   a content control component operative to manage an enhanced repeating section content control embedded in a document part of the document template, the enhanced repeating section content control associated with a data store arranged to store formatted content presented by the enhanced repeating section content control, the content control component operative to synchronize changes to the formatted content between the enhanced repeating section content control and the data store, wherein the enhanced repeating section content control is placed around at least one of a: paragraph, a row, and a table in a document part, and is operative to insert a cloned copy of the enhanced repeating section content control into the document part in response to receiving a control directive at the enhanced repeating section content control; and
   a document generator component operative to generate the document from the document template with the enhanced repeating section content control.

2. The apparatus of claim 1, the content control component operative to receive control directives to modify the formatted content, the control directives comprising instructions to modify a formatting option or a style option for the formatted content.

3. The apparatus of claim 1, the content control component operative to receive control directives to modify the formatted content, the control directives comprising instructions to modify a font, a font style, a font size, a font color, an underline style, an underline color, an effect, a text effect, a text fill, a text outline, an outline style, a text shadow, a text reflection, a text glow, a text edge, or a text three dimensional format.

4. The apparatus of claim 1, the content control component operative to receive control directives to modify the formatted content presented by the enhanced repeating section content control, present the modified formatted content in a presentation field of the enhanced repeating section content control, and send the modified formatted content to the data store.

5. The apparatus of claim 1, the content control component operative to detect the formatted content stored in the data store has been modified, and send the modified formatted content to the enhanced repeating section content control for presentation in a presentation field of the enhanced repeating section content control.

6. The apparatus of claim 1, the content control component operative to communicate the modified formatted content using a data schema different from a data schema of the formatted content stored in the data store.

7. The apparatus of claim 1, the data store arranged to store the formatted content according to an extensible markup language (XML) data schema.

8. The apparatus of claim 1, the content control component operative to serialize extensible markup language (XML) elements of the formatted content to form a string of XML elements, remove reserved XML characters from the string of XML elements, and store any remaining text from the XML elements in the data store.

9. A method, comprising:
   presenting a document template with an enhanced repeating section content control having formatted content in a presentation field of the enhanced repeating section content control, wherein the enhanced repeating section content control is placed around at least one of a: paragraph, a row, and a table in a document part, and is operative to insert a cloned copy of the enhanced repeating section content control into the document part in response to receiving a control directive at the enhanced repeating section content control;
   receiving control directives to modify the formatted content; and
   synchronizing the modified formatted content between the content control and a data store associated with the enhanced repeating section content control.

10. The method of claim 9, comprising receiving control directives to modify the formatted content presented by the enhanced repeating section content control or stored in the data store.

11. The method of claim 9, comprising:
   receiving control directives to modify formatted content presented by the enhanced repeating section content control;
   presenting the modified formatted content in the presentation field of the enhanced repeating section content control; and
   sending the modified formatted content to the data store.

12. The method of claim 9, comprising:
receiving control directives to modify formatted content stored in the data store;
sending the modified formatted content to the enhanced repeating section content control; and
presenting the modified formatted content in the presentation field of the content control.

13. The method of claim 9, comprising communicating the modified formatted content between the enhanced repeating section content control and the data store using a data schema different from a data schema of the formatted content stored in the data store.

14. The method of claim 9, comprising:
serializing extensible markup language (XML) elements of the formatted content to form a string of XML elements;
removing reserved XML characters from the string of XML elements; and
storing any remaining text from the XML elements in the data store.

15. An article of manufacture comprising a storage medium containing instructions that when executed cause a system to:
present an enhanced repeating section content control with formatted content in a document, wherein the enhanced repeating section content control placed around at least one of a: paragraph, a row, and a table in a document part, and is operative to insert a cloned copy of the enhanced repeating section content control into the document part in response to receiving a control directive at the enhanced repeating section content control;
receive control directives to modify the formatted content; and
synchronize changes to the formatted content between the enhanced repeating section content control and a custom extensible markup language (XML) part associated with the document.

16. The article of manufacture of claim 15, further comprising instructions that when executed cause the system to receive control directives to modify the formatted content presented by the enhanced repeating section content control or stored in the XML part.

17. The article of manufacture of claim 15, further comprising instructions that when executed cause the system to:
receive control directives to modify formatted content presented by the enhanced repeating section content control;
present the modified formatted content by the enhanced repeating section content control; and
send the modified formatted content to the XML part.

18. The article of manufacture of claim 15, further comprising instructions that when executed cause the system to:
receive control directives to modify formatted content stored in the XML part;
send the modified formatted content to the enhanced repeating section content control; and
present the modified formatted content by the enhanced repeating section content control.

19. The article of manufacture of claim 15, further comprising instructions that when executed cause the system to send the modified formatted content to the XML part using a data schema different from a data schema of the formatted content stored in the XML part.

20. The article of manufacture of claim 15, further comprising instructions that when executed cause the system to:
serialize XML elements of the formatted content to form a string of XML elements;
remove reserved XML characters from the string of XML elements; and
store text from the XML elements in the XML part.

* * * * *